(12) United States Patent
Kurokawa et al.

(10) Patent No.: US 8,133,601 B2
(45) Date of Patent: Mar. 13, 2012

(54) MAGNETIC RECORDING MEDIUM AND MAGNETIC RECORDING AND REPRODUCING APPARATUS

(75) Inventors: Gohei Kurokawa, Ichihara (JP); Yuzo Sasaki, Ichihara (JP); Tatsu Komatsuda, Ichihara (JP); Atsushi Hashimoto, Chiba (JP)

(73) Assignee: Showa Denko K.K., Tokyo (JP)

( * ) Notice: Subject to any disclaimer, the term of this patent is extended or adjusted under 35 U.S.C. 154(b) by 47 days.

(21) Appl. No.: 12/674,602

(22) PCT Filed: Aug. 25, 2008

(86) PCT No.: PCT/JP2008/065089
§ 371 (c)(1),
(2), (4) Date: Feb. 22, 2010

(87) PCT Pub. No.: WO2009/028447
PCT Pub. Date: Mar. 5, 2009

(65) Prior Publication Data
US 2011/0111257 A1    May 12, 2011

(30) Foreign Application Priority Data
Aug. 31, 2007    (JP) .................................. 2007-226399

(51) Int. Cl.
G11B 5/66    (2006.01)

(52) U.S. Cl. .................................................... 428/831.2

(58) Field of Classification Search .................. None
See application file for complete search history.

(56) References Cited

U.S. PATENT DOCUMENTS

| | | | |
|---|---|---|---|
| 7,368,185 B2 | 5/2008 | Hirayama et al. | |
| 2003/0049498 A1 | 3/2003 | Shimosato | |
| 2006/0210836 A1 | 9/2006 | Gouke | |
| 2006/0222902 A1* | 10/2006 | Mukai ........................... | 428/827 |
| 2007/0259214 A1 | 11/2007 | Takahashi et al. | |
| 2008/0186627 A1* | 8/2008 | Hirayama et al. ............ | 360/110 |

FOREIGN PATENT DOCUMENTS

| | | |
|---|---|---|
| CN | 1637870 A | 7/2005 |
| CN | 1835090 A | 9/2006 |

(Continued)

OTHER PUBLICATIONS

S. N. Piramanayagam, et al., "Grain size reduction in CoCrPt: $SiO_2$ perpendicular recording media with oxide-based intermediate layers", Applied Physics Letters, 2006, pp. 162504-1-162504-3, vol. 89.
Chinese Office Action mailed Apr. 25, 2011 with English translation.

*Primary Examiner* — Holly Rickman
(74) *Attorney, Agent, or Firm* — Sughrue Mion, PLLC (57) ABSTRACT

A magnetic recording medium is provided which can record and reproduce high-density information by maintaining perpendicular orientation of a magnetic recording layer even with a decrease in thickness of nonmagnetic layers from an intermediate layer to a seed layer while decreasing the grain size of magnetic crystal grains to be consistent with an increase in recording density. A manufacturing method thereof and a magnetic recording and reproducing apparatus are also provided. The magnetic recording medium is a perpendicular magnetic recording medium including at least an underlying layer, an orientation control layer, a magnetic recording layer, and a protective layer formed on a nonmagnetic substrate. Here, the orientation control layer includes two or more layers of a seed layer and an intermediate layer from the substrate side. Materials of the seed layer and the intermediate layer are selected so that a contact angle of the intermediate layer material with respect to the seed layer material, which is amorphous, is in the range of 10 to 100 degrees.

14 Claims, 1 Drawing Sheet

FOREIGN PATENT DOCUMENTS

| | | |
|---|---|---|
| CN | 1841512 A | 10/2006 |
| JP | 61-113122 A | 5/1986 |
| JP | 2001-006158 A | 1/2001 |
| JP | 2003-115106 A | 4/2003 |
| JP | 2005-092970 A | 4/2005 |
| JP | 2005-190517 A | 7/2005 |
| JP | 2006-155865 A | 6/2006 |
| JP | 2006-309919 A | 11/2006 |
| JP | 2007-102833 A | 4/2007 |
| WO | 2006/046776 A1 | 5/2006 |

* cited by examiner

MAGNETIC RECORDING MEDIUM AND MAGNETIC RECORDING AND REPRODUCING APPARATUS

TECHNICAL FIELD

The present invention relates to a magnetic recording medium and a magnetic recording and reproducing apparatus employing the magnetic recording medium.

Priority is claimed on Japanese Patent Application No. 2007-226399, filed Aug. 31, 2007, the content of which is incorporated herein by reference.

BACKGROUND ART

In recent years, the application range of magnetic recording apparatuses such as magnetic disk apparatuses, flexible disk apparatuses, and magnetic tape apparatuses has increased remarkably and their importance has also increased. Therefore, a technique has been developed for significantly improving the recording density of a magnetic recording medium used for these apparatuses. In particular, the introduction of an MR (magneto resistive) head and a PRML (partial response maximum likelihood) technique has accelerated improvement in surface recording density of the magnetic recording medium. In recent years, with the introduction of GMR (giant magnetoresistance) heads and TuMR (tunneling magnetoresistance) heads, the increase in the surface recording density of the magnetic recording medium has increased significantly and continues to increase at a pace of 30% to 40% each year.

In this way, there is a need for an increase in recording density of magnetic recording medium and there is also a need for an increase in coercive force, a high signal-to-noise ratio (SNR), and high resolution of a magnetic recording layer. In a longitudinal magnetic recording system which has generally been used, with the increase in linear recording density, recording magnetic domains adjacent to a magnetization transition region mutually weaken their magnetizations, which is called self-demagnetization. In order to prevent the self-demagnetization, it is necessary to reduce the thickness of the magnetic recording layer to increase the shape magnetic anisotropy.

On the other hand, when the thickness of the magnetic recording layer is reduced, the strength of an energy barrier for maintaining the magnetic domain is substantially equal to that of thermal energy, and the phenomenon (heat fluctuation phenomenon) in which an amount of recorded magnetization is reduced due to a temperature variation is not negligible. Accordingly, it is said that the heat fluctuation phenomenon determines the limit of the linear recording density.

In recent years, a medium having an AFC (anti-ferromagnetic coupling) structure has been proposed as the technique for improving the linear recording density in the longitudinal magnetic recording system, thereby solving thermo-magnetism relaxation which is a problem in the longitudinal magnetic recording system.

As a technique for further improving the surface recording density, a perpendicular magnetic recording technique has attracted attention. A medium is magnetized in the in-plane direction in the longitudinal magnetic recording system, but a medium is magnetized in a direction substantially perpendicular to the surface of the medium in the perpendicular magnetic recording system. Accordingly, since it is possible to avoid the self-demagnetization that prevents the increase in linear recording density in the longitudinal magnetic recording system, it is considered that the perpendicular magnetic recording system is suitable for high-density recording. In addition, since the perpendicular magnetic recording system can keep the thickness of the magnetic layer constant, it is possible to relatively reduce the influence of the thermomagnetism relaxation which causes a problem in the longitudinal magnetic recording system.

In general, a perpendicular magnetic recording medium is obtained by sequentially forming a seed layer, an intermediate layer, a magnetic recording layer, and a protective layer on a nonmagnetic substrate. In many cases, a lubricant layer is formed on the surface of the protective layer. In many cases, a magnetic film which is called a soft magnetic underlying layer is disposed below the seed layer. The intermediate layer is formed in order to further improve the characteristics of the magnetic recording layer. In addition, the seed layer serves to align the crystal particles of the intermediate layer and the magnetic recording layer, and to control the shape of magnetic crystals.

The improvement in crystalline orientation and the decrease in crystal grain size of the magnetic recording layer are important in the manufacturing of a perpendicular magnetic recording medium with good characteristics. That is, in the perpendicular magnetic recording medium, the magnetic recording layer is formed of a Co alloy material and the crystal structure thereof is a hexagonal closest-packed (hcp) structure. It is important that a (002) crystal face of the hexagonal closest-packed structure is parallel to the surface of the substrate, that is, a crystal c-axis ([002] axis) is aligned in a direction substantially perpendicular to the surface of the substrate with the least possible disorder.

In order to align the crystal particles of the magnetic recording layer with the least possible disorder, the intermediate layer of the perpendicular magnetic recording medium has been made of Ru having the same hexagonal closest-packed structure as the magnetic recording layer. Since the crystal particles of the magnetic recording layer epitaxially grow on the (002) crystal face of Ru, a magnetic recording medium with good crystalline orientation is obtained (for example, see Patent Citation 1).

That is, since the orientation of the magnetic recording layer is improved by enhancing the degree of (002) crystal face orientation of the Ru intermediate layer, the (002) crystal face orientation of Ru should be improved to improve the recording density of the perpendicular magnetic recording medium. However, when an Ru film is formed directly on an amorphous underlying layer, the thickness of the Ru film increases to obtain the good crystalline orientation and the amorphous Ru weakens the attraction of magnetic flux from a head in the underlying layer which is formed of a soft magnetic material at the time of recording. Therefore, in the past, a seed layer for orientation on the (111) crystal face of a face-centered cubic structure is interposed between the underlying layer and the Ru intermediate layer (For example, see Patent Citation 2). Since the seed layer having the face-centered cubic structure can provide a high crystalline orientation property even with a thickness of about 5 nm, Ru on the seed layer having the face-centered cubic structure can provide a high crystalline orientation property with a thickness smaller than that of Ru formed directly on the underlying layer.

However, in order to further improve the recording density, it is necessary to further strengthen the attraction of magnetic flux from the head in the underlying layer. When a material having a high saturated magnetization Bs is selected as a soft magnetic material to strengthen the attraction of magnetic flux, a part of the soft magnetic material is finely crystallized and thus the unevenness of the surface of the underlying layer increases, thereby deteriorating the orientation of the magnetic recording layer. As another technique for strengthening the attraction of magnetic flux, the thickness of the nonmagnetic layers from the intermediate layer below the magnetic recording layer to the seed layer can be reduced. However, when the seed layer having the face-centered cubic structure used in the related art has a thickness equal to or smaller than 5 nm, the orientation of the intermediate layer is rapidly deteriorated and thus the thickness cannot be set to be equal to or smaller than 5 nm. In view of the above-mentioned situation, in order to further improve the recording density, there is a need for a seed layer which can maintain the orientation of the intermediate layer or the magnetic recording layer to a certain extent even with a thickness of 5 nm or less.

A decrease in crystal grain size of the magnetic recording layer is necessary for improving the recording density. In the existing crystalline seed layer as well as the seed layer having the face-centered cubic structure, since a single Ru crystal grain of the intermediate layer epitaxially grows on a single crystal grain of the seed layer, the decrease in crystal grain size of the seed layer can be considered as a method of reducing the crystal grain size of Ru of the magnetic recording layer or the intermediate layer. There have been various studies on the materials of the seed layer and the intermediate layer and the film forming method, but it was not possible to reduce the crystal grain size of the seed layer while maintaining the crystalline orientation of the intermediate layer or the magnetic recording layer.

As another method of reducing the crystal grain size of the intermediate layer or the magnetic recording layer on the seed layer, it was reported that the intermediate layer can be formed with a granular structure including a crystal grain portion of Ru and a grain boundary portion of oxide and the like surrounding the crystal grain portion, which is generally used in the magnetic recording layer (for example, Non-Patent Citation 1). When the grain boundary portion of the intermediate portions is thickened by increasing the amount of oxide using this method, it is possible to reduce the crystal grain size by as much. When an oxide magnetic layer such as a CoCrPt—$SiO_2$ layer is formed on the intermediate layer, the granular structures are connected to each other from the intermediate layer to the magnetic recording layer, the decrease in grain size of the magnetic crystal grains or the segregation of oxide is promoted to reduce the noise, and the improvement of the recording and reproducing characteristics is thus expected.

However, since the change of the intermediate layer to the granular structure is not the decrease in grain size of the seed layer, the number of crystal grains per unit area is not changed. Accordingly, in further increasing the recording density, the number of magnetic crystal grains per bit is decreased with the decrease in area per bit, thereby causing a decrease in signal intensity. Due to the increase in the ratio of oxide grain boundaries, Co in the magnetic crystal grains is oxidized, thereby causing a further decrease in signal intensity. In order to improve the recording and reproducing characteristics to cope with the increase in recording density, it is necessary not only to simply decrease the grain size of the magnetic crystal, but also to increase the density of the magnetic crystal grains.

Patent Citation 3 discloses that by constructing the orientation control layer out of a hcp-structured or fcc-structured layer and a hcp-structured layer from the substrate and setting the Ru contact angle therebetween to a range of 50 to 120 degrees, it is possible to manufacture a perpendicular magnetic recording medium with a high recording density in which the c axis of the crystal structure, that is, the hexagonal closest-packed structure, of the perpendicular magnetic layer is aligned with a very small angle variance with respect to the surface of the substrate and the average particle size of the crystal grains of the perpendicular magnetic layer is very small. However, in order to improve the recording and reproducing characteristics in the future, it is necessary to provide a perpendicular magnetic recording medium while maintaining excellent recording and reproducing characteristics in which the decrease in grain size of the magnetic crystal grains is consistent with the increase in recording density and the perpendicular orientation property of the magnetic recording layer. There is a need for a perpendicular magnetic recording medium which can be easily manufactured without causing the above-mentioned problems.

[Patent Citation 1] JP-A-2001-6158
[Patent Citation 2] JP-A-2005-190517
[Patent Citation 3] JP-A-2006-155865
[Non-Patent Citation 1] APPLIED PHYSICS LETTERS, vol. 89, pp. 162504

The invention is made in view of the above-mentioned situation, and an object of the invention is to provide a magnetic recording medium which can record and reproduce high-density information by causing a decrease in grain size of magnetic crystal grains to be consistent with an increase in recording density while maintaining perpendicular orientation of a magnetic recording layer, a manufacturing method thereof, and a magnetic recording and reproducing apparatus employing the magnetic recording medium.

DISCLOSURE OF INVENTION

To achieve the above-mentioned object, the invention provides the following solutions.

(1) A perpendicular magnetic recording medium comprising at least an underlying layer, an orientation control layer, a magnetic recording layer, and a protective layer formed on a nonmagnetic substrate, wherein the orientation control layer includes two or more layers of a seed layer and an intermediate layer from the substrate side, the seed layer has an amorphous structure, and a contact angle of the intermediate layer material with respect to the seed layer material is in the range of 10 to 100 degrees.

(2) The magnetic recording medium according to (1), wherein at least one layer of the intermediate layer has a hexagonal closest-packed structure or a face-centered cubic structure and crystal grains are segregated from surrounding crystal grains thereof by oxide, nitride, and voids.

(3) The magnetic recording medium according to (1) or (2), wherein at least one of the intermediate layer has a granular structure including crystal grains having a hexagonal closest-packed structure and a grain boundary formed of an oxide of at least one element selected from a group consisting of Al, B, Bi, Ca, Cr, Fe, Hf, Mg, Mo, Nb, Ru, Si, Ta, Ti, W, and Zr.

(4) The magnetic recording medium according to any one of (1) to (3), wherein the seed layer has a composition classified into a body-centered cubic structure in a space group and an amorphous structure in a thin region of 10 nm.

(5) The magnetic recording medium according to any one of (1) to (4), wherein the thickness of the seed layer is in the range of 0.5 nm to 10 nm.

(6) The magnetic recording medium according to any one of (1) to (5), wherein the average crystal grain size of the intermediate layer is in the range of 1 nm to 7 nm.

(7) The magnetic recording medium according to any one of (1) to (6), wherein the seed layer is formed of an alloy material containing Cr and Mn and the content of Cr is in the range of 30 at % to 70 at %.

(8) The magnetic recording medium according to any one of (1) to (6), wherein the seed layer is formed of an alloy material containing Cr and Ti and the content of Cr is in the range of 30 at % to 75 at %.

(9) The magnetic recording medium according to any one of (1) to (6), wherein the seed layer is formed of an alloy material containing Cr and Fe and the content of Cr is in the range of 35 at % to 65 at %.

(10) The magnetic recording medium according to any one of (1) to (6), wherein the seed layer is formed of an alloy material containing Ta and the content of Ta is equal to or greater than 70 at %.

(11) The magnetic recording medium according to any one of (1) to (10), wherein at least one layer of the intermediate layer is formed of one of Ru, Re, and an alloy material thereof and has a hexagonal closest-packed structure.

(12) The magnetic recording medium according to any one of (1) to (11), wherein at least one layer of the intermediate layer is formed of an alloy material containing at least one element, which is selected from a group of elements having a face-centered cubic structure, as a main component and an element selected from a group of elements having a body-centered cubic structure and the at least one intermediate layer has a crystal structure oriented on a (111) crystal face and a layered irregular lattice (stacking fault) based on mixture of a face-centered cubic structure and a body-centered cubic structure.

(13) The magnetic recording medium according to any one of (1) to (12), wherein at least one layer of the intermediate layer is formed of an alloy material containing at least one element, which is selected from a group of elements having a face-centered cubic structure, as a main component and an element selected from a group of elements having a hexagonal closest-packed structure, and the at least one intermediate layer has a crystal structure oriented on a (111) crystal face and a layered irregular lattice (stacking fault) based on mixture of a face-centered cubic structure and a hexagonal closest-packed structure.

(14) The magnetic recording medium according to any one of (1) to (13), wherein at least one layer of the magnetic recording layer has a granular structure including ferromagnetic crystal grains and a crystal grain boundary of nonmagnetic oxide.

(15) The magnetic recording medium according to any one of (1) to (14), wherein a soft magnetic film of the underlying layer has an amorphous structure.

(16) A magnetic recording and reproducing apparatus comprising a magnetic recording medium and a magnetic head recording and reproducing information on and from the magnetic recording medium, wherein the magnetic recording medium is the magnetic recording medium according to any one of (1) to (15).

According to the invention, it is possible to provide a perpendicular magnetic recording medium with a high recording density in which the c axis of the crystal structure, that is, the hexagonal closest-packed structure, of the magnetic recording layer is aligned with a very small angle variance with respect to the surface of the substrate and the crystal grains of the magnetic recording layer have a high density and a very small average size.

DESCRIPTION OF REFERENCE NUMERALS AND SIGNS

1: NONMAGNETIC SUBSTRATE
2: SOFT MAGNETIC UNDERLYING LAYER
3: ORIENTATION CONTROL LAYER
4: SEED LAYER
5: FIRST INTERMEDIATE LAYER
6: SECOND INTERMEDIATE LAYER
7: MAGNETIC RECORDING LAYER
8: PROTECTIVE LAYER
100: MAGNETIC RECORDING MEDIUM
101: MEDIUM DRIVING UNIT
102: MAGNETIC HEAD
103: HEAD DRIVING UNIT
104: RECORDING AND REPRODUCING SIGNAL PROCESSING SYSTEM

BEST MODE FOR CARRYING OUT THE INVENTION

Hereinafter, the invention will be described in detail with reference to the accompanying drawings.

Figure 1:
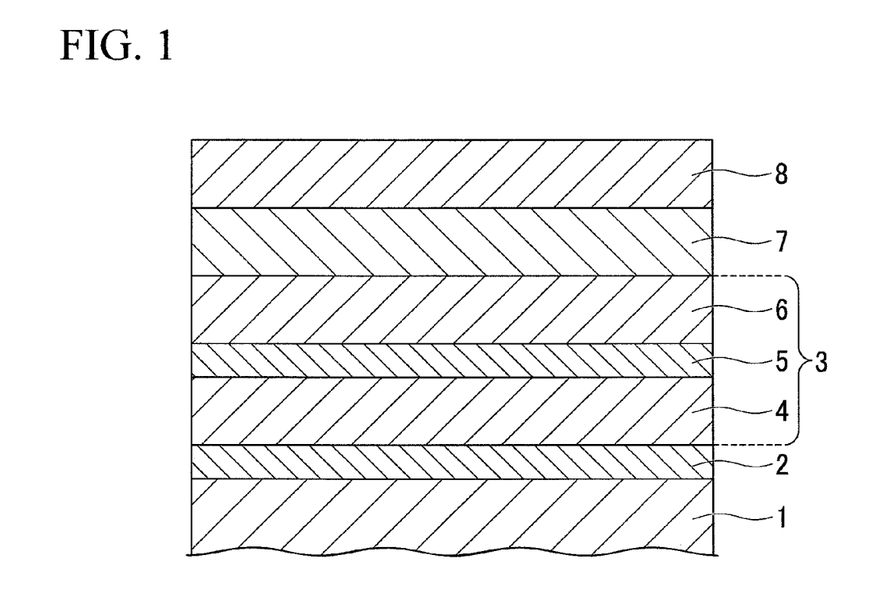
FIG. 1 is a sectional view illustrating a configuration of a perpendicular magnetic recording medium according to an embodiment of the invention.

As shown in FIG. 1, a perpendicular magnetic recording medium 100 according to an embodiment of the invention includes a soft magnetic underlying layer 2, a seed layer 4 and a first intermediate layer 5 constituting an orientation control layer 3 controlling the orientation of a film formed thereon, a second intermediate layer 6, a magnetic recording layer 7 in which an easy axis of magnetization (crystal c-axis) is aligned perpendicular to a substrate, and a protective layer 8 on a nonmagnetic substrate 1. The orientation control layer 3 includes plural layers. The orientation control layer 3 can be applied to a new perpendicular recording medium such as an ECC medium, a discrete track medium, and a pattern medium of which the recording density is expected to increase in the future.

An Al alloy substrate of Al—Mg alloy containing Al as a main component or a substrate formed of general soda glass, aluminosilicate glass, amorphous glass, silicon, titanium, ceramics, sapphire, quartz, and various resins can be used as the nonmagnetic substrate 1 used in the magnetic recording medium 100 according to the embodiment of the invention, as long as it is nonmagnetic. The Al alloy substrate or the glass substrate of crystallized glass or amorphous glass is often used. The glass substrate is preferably a mirror-polished substrate or a low-Ra substrate with Ra<1 (Å). A texture may be slightly included therein.

In a procedure of manufacturing a magnetic disk, a substrate is generally washed and dried first. In the invention, it is preferable that the substrate is washed and dried before the formation from the viewpoint of guaranteeing adhesion of the layers. The washing can be performed by etching (reverse sputter) as well as by a washing process using water. The size of the substrate is not particularly limited.

The layers of the perpendicular magnetic recording medium will be described.

The soft magnetic underlying layer 2 is provided on many perpendicular magnetic recording mediums. The soft magnetic underlying layer serves to guide a recording magnetic field from a head and to efficiently apply the perpendicular component of the recording magnetic field to the magnetic recording medium at the time of recording a signal on a medium. Materials such as an FeCo alloy, a CoZrNb alloy, a CoTaZr alloy having a soft magnetic characteristic can be used for the soft magnetic underlying layer. It is preferable that the soft magnetic underlying layer 2 has an amorphous structure. The amorphous structure can prevent the increase in surface roughness (Ra) and can reduce a lifting distance of the head, thereby increasing the recording density. In addition to a single layer of the soft magnetic layer, a layer is often used in which a very thin film of Ru or the like is interposed between two layers to cause the soft magnetic layer to have AFC. The total thickness of the underlying layer 2 is in the range of 20 nm to 120 nm and can be properly determined depending on the balance of the recording and reproducing characteristic and the overwrite (OW) characteristic.

In the invention, the orientation control layer 3 controlling the orientation of a film formed thereon is disposed on the soft magnetic underlying layer 2. The orientation control layer 3 includes plural layers which are called the seed layer 4 and the intermediate layer from the substrate side.

In the invention, the average crystal grain size of the intermediate layer of 7 nm or less is embodied in consideration of the wettability of the material of the intermediate layer with respect to the seed layer 4 which is amorphous. Here, the average crystal grain size is a value of an average diameter obtained by statistically processing diameters of crystal grains which are clearly separated when the crystal shape of a film is observed, for example, with a transmission electron microscope (TEM). In order to prompt intermediate layer crystals to grow on the amorphous seed layer 4 while maintaining a small crystal grain size, it is preferable that the wettability of the intermediate layer on the seed layer 4 is not so good. A contact angle is generally used as an indicator for the wettability. The contact angle is a quantity calculated as a tangent angle of a droplet which is formed by dropping melted intermediate layer material on the solid-state material of the seed layer with respect to the solid surface. The poor wettability means that the contact is large. That is, when the intermediate material with the poor wettability with respect to the material of the seed layer 4 is used, small crystal grains can be easily formed at the time of depositing the intermediate layer on the seed layer 4. Particularly, a combination of the material of the seed layer 4 and the material of the intermediate layer in which the contact angle is in the range of 10 to 100 degrees can be preferably used in the invention. The seed layer 4 is preferably formed of a material with a melting point of 800° C. or higher.

Values described in a data book or the like can be used as the contact angle θ defined in the invention and can be calculated by the following expression.

$$\theta = \arc\cos\{(\gamma_S^X - \gamma_{SL}^{X-Y})/\gamma_L^Y\}$$

Here, $\gamma_S^X$ represents the surface free energy of the material of the seed layer 4, $\gamma_L^Y$ represents the surface free energy of the material of the intermediate layer, and $\gamma_{SL}^{X-Y}$ represents the interface energy of the material of the seed layer 4 and the material of the intermediate layer.

In the invention, in selecting the material of the seed layer 4 which is amorphous, the dependency of the crystalline orientation of the intermediate layer on the thickness of the seed layer 4 is important in addition to the wettability of the material of the intermediate layer. When the seed layer 4 is formed of the amorphous material, it is known that the surface unevenness of the seed layer 4 is reduced with the increase in thickness of the seed layer 4 and thus the crystalline orientation of the intermediate layer 4 is improved. However, in order to improve the recording and reproducing characteristics, the magnetic flux from a head should be attracted to the magnetic recording layer 7 as much as possible. Accordingly, when the thickness of the seed layer 4 which is nonmagnetic is increased, the distance between the magnetic recording layer 7 and the underlying layer 2 formed of a soft magnetic material is increased and thus the attraction of the magnetic flux is weakened. Therefore, it is preferable in the invention that the crystalline orientation of the intermediate layer can be maintained even when the amorphous seed layer 4 has a small thickness equal to or less than 5 nm. Specifically, a Cr—Ti alloy, a Cr—Mn alloy, a Cr—Fe alloy, or a Ta alloy can be preferably used which has a composition classified into a body-centered cubic structure in a space group and which is amorphous in a thin region of about 10 nm.

In the intermediate layer of the invention, small crystal grains are formed in an alloy material containing Ru, Re, or alloys thereof having a hexagonal closest-packed structure and in an alloy material having a crystal structure oriented on a (111) crystal face and a layered irregular lattice (stacking fault) based on the mixture of a face-centered cubic structure and a body-centered cubic structure or the mixture of a face-centered cubic structure and a hexagonal closest-packed structure.

Since the crystalline orientation of the magnetic recording layer stacked on the intermediate layer is substantially determined by the crystalline orientation of the intermediate layer, the orientation control of the intermediate layer is very important in manufacturing the perpendicular magnetic recording medium. When the wettability of the material of the intermediate layer with respect to the material of the seed layer 4 is not good, it is preferable that the gas pressure at the time of forming a film is low in an initial growing portion of the intermediate layer in order to improve the crystalline orientation of the intermediate layer. However, when the plural intermediate layer crystal grains on the crystal grains of the seed layer 4 continuously grow with the low gas pressure, the crystal grains are combined during the growing of the film. Since a single crystal grain of the magnetic recording layer 7 epitaxially grows on the combined crystal grain of the intermediate layer, the crystal grain size increases up to the size of the combined crystal grain of the intermediate layer.

Accordingly, in the invention, at least two intermediate layers of the first intermediate layer 5 and the second intermediate layer 6 from the substrate side are disposed as the intermediate layer. In the invention, it is preferable that the first intermediate layer 5 is formed with a low gas pressure equal to or less than 1 Pa to improve the crystalline orientation of the intermediate layer. In order to improve the crystalline orientation and to suppress the combination of the crystal grains, the thickness of the first intermediate layer 5 is preferably equal to or more than 1 nm and equal to or less than 15 nm, and more preferably equal to or more than 5 nm and equal to or less than 10 nm.

The second intermediate layer 6 of the invention has a hexagonal closest-packed structure or a face-centered cubic structure to cause the magnetic recording layer 7 formed thereon to grow epitaxially. In order to generate voids between the crystal grains to suppress the combination of the crystal grains by a high-pressure film forming process, the gas pressure is preferably equal to or more than 1.5 Pa and more preferably equal to or more than 3 Pa. When a crystal grain is surrounded with a grain boundary of oxide or nitride, it is possible to suppress the combination of the crystal grains and to decrease the size of the crystal grains by increasing the grain boundary width. In the invention, by suppressing the combination of the crystal grains of the intermediate layer, a single crystal grain of the magnetic recording layer 7 epitaxially grows on a signal crystal grain of the intermediate layer and thus the increase in crystal grain density of the magnetic recording layer 7 is consistent with the decrease in grain size.

In the invention, the second intermediate layer 6 may be a stacked thin film of Ru, Re, or alloys thereof and at least one layer of the intermediate layer is preferably oriented on the (002) crystal face of the hexagonal closest-packed structure. In the perpendicular magnetic recording medium, the crystal structure of the magnetic recording layer often has the hexagonal closest-packed structure, but it is important that the (002) crystal face is parallel to the surface of the substrate, that is, that the crystal c-axis ([002] axis) is aligned in the perpendicular direction with the least possible disorder. A half-value width of a rocking curve can be used in an estimation method thereof. First, a film formed on a substrate is set in an X-ray diffraction apparatus and the face surface parallel to the surface of the substrate is analyzed. When a sample includes a film such as the intermediate layer or the magnetic recording layer 7 having the hexagonal closest-packed structure, a diffraction peak corresponding to the crystal face is observed. In a perpendicular magnetic recording medium employing a Co alloy, the c-axis ([002] axis) of the hexagonal closest-packed structure is aligned perpendicular to the surface of the substrate and thus a peak corresponding to the (002) crystal face is observed. While maintaining a Bragg angle at which the (002) face is diffracted, an optical system is made to swing the surface of the substrate. When the diffraction strength of the (002) crystal face is plotted with respect to the angle at which the optical system is tilted, a single diffraction peak can be drawn. This is called rocking curve. When the (002) crystal face is aligned parallel to the surface of the substrate, a sharp rocking curve can be obtained. On the contrary, when the direction of the (002) crystal face is distributed widely, a broad rocking curve can be obtained. Therefore, the half-value width $\Delta\theta 50$ of the rocking curve is often used as an indicator of the crystalline orientation of the perpendicular magnetic recording medium.

According to the invention, it is possible to easily manufacture a perpendicular magnetic recording medium with small $\Delta\theta 50$.

The magnetic recording layer is a layer on which a signal is recorded literally. The magnetic recording layer is often formed of a Co alloy film such as CoCr, CoCrPt, CoCrPtB, CoCrPtB—X, CoCrPtB—X—Y, CoCrPt—O, CoCrPtRu—O, CoCrPt—SiO$_2$, CoCrPt—Cr$_2$O$_3$, CoCrPt—TiO$_2$, CoCrPt—ZrO$_2$, CoCrPt—Nb$_2$O$_5$, CoCrPt—Ta$_2$O$_5$, CoCrPt—B$_2$O$_3$, CoCrPt—WO$_2$, CoCrPt—WO$_3$, and CoCrPt—RuO$_2$. Particularly, when an oxide magnetic layer is used, oxides surround a magnetic Co crystal grain to have a granular structure, whereby the magnetic interaction between the Co crystal grains is weakened and the noise is reduced. Finally, the crystal structure and the magnetic characteristics of the layer determine the recording and reproducing characteristics.

In general, a DC magnetron sputtering method or an RF sputtering method is used to form the above-mentioned layers. An RF bias, a DC bias, a pulse DC, a pulse DC bias, O$_2$ gas, H$_2$O gas, H$_2$ gas, and N$_2$ gas may be used. The gas pressure for the sputtering is properly determined to optimize the characteristics of the layers, and is generally controlled to be in the range of 0.1 to 30 Pa. The gas pressure is adjusted depending on the performance of the medium.

The protective layer 8 serves to protect a medium from a damage resulting from a contact of a head with the medium and is formed of a carbon film or an SiO$_2$ film. The carbon film is more often used. A sputtering method or a plasma CVD method is used to form the film and the plasma CVD method is more often used in the recent years. A magnetron plasma CVD method can be also used. The thickness is in the range of 1 nm to 10 nm, preferably in the range of 2 nm to 6 nm, and more preferably in the range of 2 nm to 4 nm.

Figure 2:
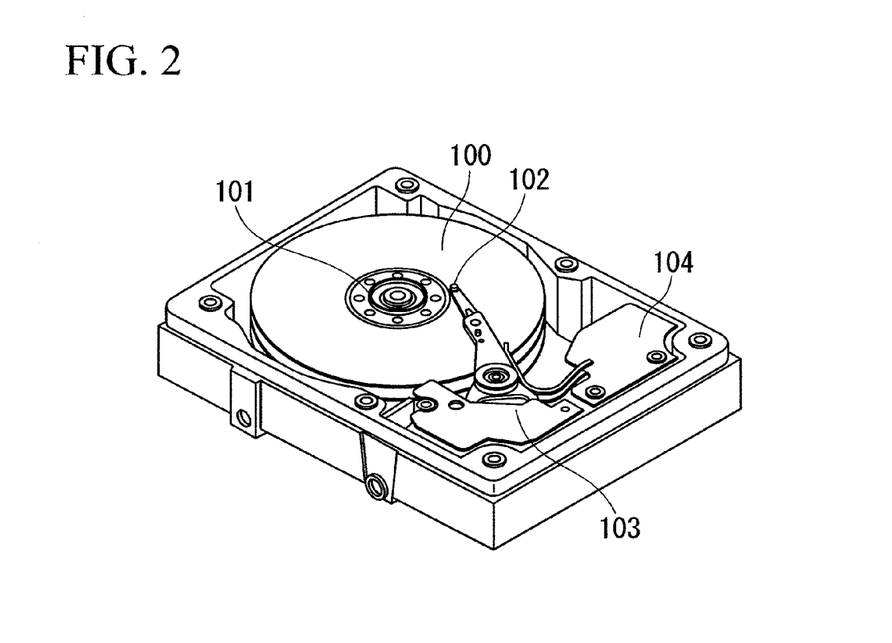
FIG. 2 is a diagram illustrating a structure of a perpendicular magnetic recording and reproducing apparatus according to an embodiment of the invention.

FIG. 2 is a diagram illustrating an example of a perpendicular magnetic recording and reproducing apparatus employing the perpendicular magnetic recording medium. The magnetic recording and reproducing apparatus shown in FIG. 2 includes a magnetic recording medium 100, a medium driving unit 101 rotationally driving the magnetic recording medium 100, a magnetic head 102 recording and reproducing information on and from the magnetic recording medium 100, a head driving unit 103 moving the magnetic head 102 relative to the magnetic recording medium 100, and a recording and reproducing signal processing system 104.

The recording and reproducing signal processing system 104 serves to process data input from the outside and to send a recording signal to the magnetic head 102, and serves to process a reproducing signal from the magnetic head 102 and to send the processed data to the outside.

A magnetic head which includes a reproducing device such as an MR device an anisotropic magnetoresistance (AMR) effect, a GMR device using a giant magnetoresistance (GMR) effect, and a TuMR device using a tunneling effect and which is suitable for a higher recording density can be used as the magnetic head 102 of the magnetic recording and reproducing apparatus according to the invention.

EXAMPLES

Hereinafter, examples of the invention will be described in detail.

Example 1 and Comparative Example 1

A vacuum chamber in which an HD glass substrate is set was exhausted by vacuum in advance to $1.0\times10^{-5}$ Pa or less.

Then, a soft magnetic underlying layer formed of Co10Ta5Zr with a thickness of 50 nm was formed on the substrate in the atmosphere of Ar with a gas pressure of 0.6 Pa using a sputtering method.

Cr40Ti, Cr50Ti, Cr60Ti, Cr40Mn, Cr50Mn, Cr60Mn, Cr70Mn, Cr40Fe, Cr50Fe, Cr60Fe, and Ta20Cr (at %) were formed as a seed layer with a thickness of 5 nm and Ru was formed as a first intermediate layer in the atmosphere of Ar with a gas pressure of 0.6 Pa, respectively (Examples 1-1 to 1-11). Ru-3(Cr$_2$O$_3$) (mol %) with a thickness of 15 nm was formed as a second intermediate layer in the atmosphere of Ar with a gas pressure of 5 Pa. In comparative examples, Cr, Cr20Ti, Cr80Ti, Ti, Cr20Mn, Cr80Mn, Mn, Cr20Fe, Cr80Fe, and Fe were formed as a seed layer with a thickness of 5 nm in the atmosphere of Ar with a gas pressure of 0.6 Pa (Comparative Examples 1-1 to 1-10). A first intermediate layer and a second intermediate layer were formed under the same conditions as the examples.

91(Co15Cr15Pt)-9(SiO$_2$) (mol %) was formed as a magnetic recording layer and a C film was formed as a protective layer, whereby perpendicular magnetic recording mediums were obtained.

A lubricant was applied to the obtained perpendicular magnetic recording mediums (Example 1-11 and Comparative Examples 1-1 to 1-10) and the recording and reproducing characteristics were tested using a read and write analyzer 1632 made by GUZIK Technical Enterprises and a spin stand S1701MP. Thereafter, a magnetostatic characteristic was tested using a Kerr measuring apparatus. In order to examine the crystalline orientation of the Co alloy in the magnetic recording layer, the rocking curve of the magnetic layer was measured using an X-ray diffraction apparatus.

The signal-to-noise ratio (SNR), the coercive force (Hc), the delta θ50, and the Co average crystal grain size in the examples and the comparative examples based on the measurements are listed in Table 1. Any parameter thereof is an indicator widely used to estimate the performance of the perpendicular magnetic recording medium.

In Table 1, since Ru of the intermediate layer was orientated on the (002) crystal face on the seed layers used in Examples 1 and the magnetic recording layer formed just thereon epitaxially grew in the (002) crystal face orientation, a small value could be obtained as the delta θ50. Since the wettability of Ru of the intermediate layer was not good and the grain size was controlled, a high SNR was obtained. On the other hand, In Cr≧80 (at %), since the seed layer of the comparative examples was aligned in the (110) crystal face orientation of the body-centered cubic structure, Ru was aligned in the (101) crystal face orientation, not in the (002) crystal face orientation, and thus the delta θ50 of the magnetic recording layer could not be estimated. The SNR was also low. In Ti≧80 (at %), since the seed layer was aligned in the (002) crystal face orientation of the hexagonal closest-packed structure, the intermediate layer and the magnetic recording layer also epitaxially grew in the (002) crystal face orientation. However, in order to obtain the crystal orientation property of the magnetic recording layer equivalent to that in the case where an amorphous seed layer is used, it is necessary to form the Ti alloy with a thickness of 10 nm or more. However, when the thickness of the seed layer increased, the attraction of the magnetic flux from the head at the time of recording is weakened and thus the SNR value is lowered. In Mn≧80 (at %), since the seed layer was finely crystallized and the surface unevenness was great, Ru could not be oriented. In Fe≧80 (at %), since the seed layer was aligned in the (110) crystal face orientation similarly to Cr and the magnetic moment of Fe serves as a noise, the orientation and the SNR were deteriorated.

Example 2, Comparative Example 2

Similarly to Example 1, a soft magnetic layer was formed on a glass substrate. Cr50Ti, Cr50Mn, and Cr50Fe with a thickness of 5 nm were formed as a seed layer in the atmosphere of Ar with a gas pressure of 0.6 Pa (Examples 2-1 to 2-3). In the comparative example thereof, Ni, Pt, and Mg with a thickness of 5 nm were formed in the atmosphere of Ar with a gas pressure of 0.6 Pa (Comparative Examples 2-1 to 2-3).

Then, Ru with a thickness of 10 nm was formed as a first intermediate layer and Ru-8TiO$_2$ (mol %) with a thickness of 10 nm was formed as a second intermediate layer in the atmosphere of Ar with gap pressures of 0.6 Pa and 10 Pa. 91(Co15Cr15Pt)-9(SiO$_2$) was formed as a magnetic recording layer and a carbon film was formed as a protective layer, whereby a perpendicular magnetic recording medium was obtained.

In the examples and the comparative examples, the signal-to-noise ratio (SNR) and the overwrite property (OW) were measured by the Guzik measurement, the coercive force Hc was measured by the Kerr measurement, and the delta θ50 was measured by the X-ray diffraction measurement. The crystal grain size of the Co alloy of the magnetic recording layer was measured using a planar TEM image of the magnetic recording layer. The results are listed in Table 1.

As can be seen from Table 1, in the Ni or Pt seed layer with the face-centered cubic structure, since the crystalline orientation was good but the grain size was not controlled, the SNR was lower than those of the examples. In the Mg seed layer with the hexagonal closest-packed structure, since the wettability of Ru was not good, the grain size was controlled. However, since the (002) crystal face orientation of Mg was not sufficient with the thickness of 5 nm, the SNR was lowered. In the examples, the coercive force of the Mg seed layer is lower than that of the Ni or Pt seed layer. This is because the crystal grain size of the magnetic recording layer was reduced and thus it was easily influenced by heat fluctuation, whereby the coercive force was lower than the actual value.

Example 3 and Comparative Example 3

90(Fe30Co)5Ta5Zr was formed as a soft magnetic layer on a glass substrate. Cr50n, Cr50Mn, and Cr50Fe with thicknesses of 5 nm and 3 nm were formed as a seed layer in the atmosphere of Ar with a gas pressure of 0.6 Pa (Examples 3-1 to 3-6). In the comparative example thereof, Ni, Pt, and Mg with thicknesses of 5 nm and 3 nm were formed in the atmosphere of Ar with a gas pressure of 0.6 Pa (Comparative Examples 3-1 to 3-6).

Similarly to Example 2, Ru with a thickness of 10 nm was formed as a first intermediate layer and Ru-8TiO$_2$ (mol %) with a thickness of 10 nm was formed as a second intermediate layer in the atmosphere of Ar with gap pressures of 0.6 Pa and 10 Pa. 91(Co15Cr15Pt)-9(SiO$_2$) was formed as a magnetic recording layer and a carbon film was formed as a protective layer, whereby a perpendicular magnetic recording medium was obtained.

The SNR, the OW, the Hc, the Δθ50, and the crystal grain size of the Co alloy of the magnetic recording layer are listed in the examples and comparative examples in Table 1.

In Example 3, the material of the soft magnetic underlying layer was changed from Co10Ta5Zr in Example 2 to 90(Fe30Co)5Ta5Zr. By adding Fe having a high saturated magnetization Bs to lower the composition of Ta which is a nonmagnetic element, the saturated magnetization was increased and the overwrite property was improved. However, the amorphous property of the film was deteriorated and a part was crystallized, whereby the surface unevenness was increased. Accordingly, in the crystalline seed layers of Ni, Pt, and Mg, the orientation property of the seed layers was deteriorated with the thickness of 5 nm. Accordingly, in spite of the increase in the overwrite property due to the increase in Bs of the underlying layer, the SNR was lowered in comparison with Comparative Example 2. When the thickness of the seed layer was further decreased, the OW property was improved but the orientation property was deteriorated, whereby the SNR was also lowered. On the contrary, in the example in which the seed layer is amorphous, in spite of the decrease in thickness of the seed layer up to 3 nm, the orientation property of the Ru or Co alloy was maintained and thus the SNR was improved by the increase of the OW property.

TABLE 1

| Sample | Seed layer (at %) | crystal structure | Thickness (nm) | first intermediate layer | contact angle (deg.) | SNR (dB) | Hc (Oe) | Δθ 50 (deg.) |
|---|---|---|---|---|---|---|---|---|
| Example 1-1 | Cr40Ti | Amorphous | 5 | Ru (0.6 Pa) | 20 | 16.24 | 4246 | 3.5 |
| Example 1-2 | Cr50Ti | | | | 17 | 16.64 | 4312 | 3.3 |
| Example 1-3 | Cr60Ti | | | | 14 | 16.61 | 4202 | 3.5 |
| Example 1-4 | Cr40Mn | | | | 40 | 16.56 | 3984 | 3.6 |
| Example 1-5 | Cr50Mn | | | | 42 | 16.43 | 3872 | 3.4 |
| Example 1-6 | Cr60Mn | | | | 45 | 16.40 | 4105 | 3.6 |
| Example 1-7 | Cr70Mn | | | | 46 | 16.51 | 4039 | 3.5 |
| Example 1-8 | Cr40Fe | | | | 21 | 16.22 | 4419 | 3.3 |
| Example 1-9 | Cr50Fe | | | | 18 | 16.10 | 4381 | 3.3 |
| Example 1-10 | Cr60Fe | | | | 14 | 16.15 | 4334 | 3.4 |
| Example 1-11 | Ta20Cr | | | | 12 | 16.36 | 4284 | 3.6 |
| Comparative example 1-1 | Cr | bcc | 5 | Ru (0.6 Pa) | 32 | 12.51 | 3420 | unmeasurable |
| Comparative example 1-2 | Cr20Ti | bcc | | | 27 | 12.32 | 3201 | unmeasurable |
| Comparative example 1-3 | Cr80Ti | hcp | | | 5 | 13.92 | 3266 | 6.9 |
| Comparative example 1-4 | Ti | hcp | | | 0 | 14.56 | 3432 | 4.1 |
| Comparative example 1-5 | Cr20Mn | bcc | | | 36 | 12.27 | 3399 | unmeasurable |
| Comparative example 1-6 | Cr80Mn | fine crystal | | | 50 | 11.84 | 3106 | unmeasurable |
| Comparative example 1-7 | Mn | fine crystal | | | 55 | 6.89 | 2589 | unmeasurable |
| Comparative example 1-8 | Cr20Fe | bcc | | | 32 | 12.47 | 3524 | unmeasurable |
| Comparative example 1-9 | Cr80Fe | bcc | | | 6 | 10.94 | 3577 | unmeasurable |
| Comparative example 1-10 | Fe | bcc | | | 0 | 10.28 | 3461 | unmeasurable |

| Sample | Seed layer (at %) | Thickness (nm) | first intermediate layer | second intermediate layer | SNR (dB) | OW (dB) | Hc (Oe) | average grain size (nm) | Δθ 50 (deg.) |
|---|---|---|---|---|---|---|---|---|---|
| Example 2-1 | Cr50Ti | 5 | Ru (0.6 Pa) | Ru—8TiO2 (10 Pa) | 16.46 | 35.6 | 3529 | 6.2 | 3.5 |
| Example 2-2 | Cr50Mn | | | | 16.24 | 35.2 | 3661 | 6.4 | 3.5 |
| Example 2-3 | Cr50Fe | | | | 16.38 | 36.0 | 3492 | 6.6 | 3.4 |
| Comparative example 2-1 | Ni (fcc) | 5 | Ru (0.6 Pa) | Ru—8TiO2 (10 Pa) | 15.89 | 36.2 | 4320 | 9.8 | 3.4 |
| Comparative example 2-2 | Pt (fcc) | | | | 15.45 | 36.7 | 4425 | 11.2 | 3.5 |
| Comparative example 2-3 | Mg (hcp) | | | | 15.49 | 36.4 | 3562 | 6.8 | 5.5 |
| Example 3-1 | Cr50Ti | 5 | Ru (0.6 Pa) | Ru—8TiO2 (10 Pa) | 17.04 | 40.2 | 3562 | 6.2 | 3.5 |
| Example 3-2 | Cr50Mn | | | | 16.99 | 39.5 | 3599 | 6.3 | 3.4 |
| Example 3-3 | Cr50Fe | | | | 17.15 | 41.2 | 3521 | 6.5 | 3.5 |
| Example 3-4 | Cr50Ti | 3 | Ru (0.6 Pa) | Ru—8TiO2 (10 Pa) | 17.22 | 43.2 | 3520 | 6.3 | 3.5 |
| Example 3-5 | Cr50Mn | | | | 17.24 | 43.0 | 3557 | 6.4 | 3.5 |
| Example 3-6 | Cr50Fe | | | | 17.31 | 44.4 | 3489 | 6.5 | 3.6 |
| Comparative example 3-1 | Ni (fcc) | 5 | Ru (0.6 Pa) | Ru—8TiO2 (10 Pa) | 15.24 | 41.4 | 4402 | 10.2 | 4.8 |
| Comparative example 3-2 | Pt (fcc) | | | | 15.08 | 41.0 | 4376 | 11.2 | 5.2 |
| Comparative example 3-3 | Mg (hcp) | | | | 15.06 | 40.8 | 3521 | 6.4 | 7.3 |
| Comparative example 3-4 | Ni (fcc) | 3 | Ru (0.6 Pa) | Ru—8TiO2 (10 Pa) | 14.68 | 44.1 | 4389 | 9.9 | 6.1 |
| Comparative example 3-5 | Pt (fcc) | | | | 14.32 | 43.8 | 4375 | 11.4 | 6.5 |
| Comparative example 3-6 | Mg (hcp) | | | | 14.05 | 43.2 | 3493 | 6.6 | 9.6 |

INDUSTRIAL APPLICABILITY

The invention can be applied to a magnetic recording medium and a magnetic recording and reproducing apparatus employing the magnetic recording medium.

The invention claimed is:

1. A perpendicular magnetic recording medium comprising at least an underlying layer, an orientation control layer, a magnetic recording layer, and a protective layer formed on a nonmagnetic substrate, wherein the orientation control layer includes two or more layers of a seed layer and an intermediate layer from the substrate side, the seed layer has an amorphous structure, and a contact angle of the intermediate layer material with respect to the seed layer material is in the range of 10 to 100 degrees, and the seed layer is formed of an alloy material containing Cr and Mn and the content of Cr is in the range of 30 at % to 70 at %, an alloy material containing Cr and Ti and the content of Cr is in the range of 30 at % to 75 at %, or an alloy material containing Cr and Fe and the content of Cr is in the range of 35 at % to 65 at %.

2. The magnetic recording medium according to claim 1, wherein at least one layer of the intermediate layer has a hexagonal closest-packed structure or a face-centered cubic structure and crystal grains are segregated from surrounding crystal grains thereof by oxide, nitride, and voids.

3. The magnetic recording medium according to claim 1, wherein at least one of the intermediate layer has a granular structure including crystal grains having a hexagonal closest-packed structure and a grain boundary formed of an oxide of at least one element selected from a group consisting of Al, B, Bi, Ca, Cr, Fe, Hf, Mg, Mo, Nb, Ru, Si, Ta, Ti, W, and Zr.

4. The magnetic recording medium according to claim 1, wherein the thickness of the seed layer is in the range of 0.5 nm to 10 nm.

5. The magnetic recording medium according to claim 1, wherein the average crystal grain size of the intermediate layer is in the range of 1 nm to 7 nm.

6. The magnetic recording medium according to claim 1, wherein at least one layer of the intermediate layer is formed of one of Ru, Re, and an alloy material thereof and has a hexagonal closest-packed structure.

7. The magnetic recording medium according to claim 1, wherein at least one layer of the intermediate layer is formed of an alloy material containing at least one element, which is selected from a group of elements having a face-centered cubic structure, as a main component and an element selected from a group of elements having a body-centered cubic structure, and the at least one intermediate layer has a crystal structure oriented on a (111) crystal face and a layered irregular lattice (stacking fault) based on mixture of a face-centered cubic structure and a body-centered cubic structure.

8. The magnetic recording medium according to claim 1, wherein at least one layer of the intermediate layer is formed of an alloy material containing at least one element, which is selected from a group of elements having a face-centered cubic structure, as a main component and an element selected from a group of elements having a hexagonal closest-packed structure, and the at least one intermediate layer has a crystal structure oriented on a (111) crystal face and a layered irregular lattice (stacking fault) based on mixture of a face-centered cubic structure and a hexagonal closest-packed structure.

9. The magnetic recording medium according to claim 1, wherein at least one layer of the magnetic recording layer has a granular structure including ferromagnetic crystal grains and a crystal grain boundary of nonmagnetic oxide.

10. The magnetic recording medium according to claim 1, wherein a soft magnetic film of the underlying layer has an amorphous structure.

11. A magnetic recording and reproducing apparatus comprising a magnetic recording medium and a magnetic head recording and reproducing information on and from the magnetic recording medium, wherein the magnetic recording medium is the magnetic recording medium according to claim 1.

12. The magnetic recording medium according to claim 1, wherein the seed layer is formed of an alloy material containing Cr and Mn and the content of Cr is in the range of 30 at % to 70 at %.

13. The magnetic recording medium according to claim 1, wherein the seed layer is formed of an alloy material containing Cr and Ti and the content of Cr is in the range of 30 at % to 75 at %.

14. The magnetic recording medium according to claim 1, wherein the seed layer is formed of an alloy material containing Cr and Fe and the content of Cr is in the range of 35 at % to 65 at %.

* * * * *